April 14, 1959 R. ADLER 2,882,398

ELECTRON BEAM SWITCHING SYSTEM FOR MULTIPLEXING

Filed June 29, 1954 3 Sheets-Sheet 1

ROBERT ADLER
*INVENTOR.*

BY Francis W. Crotty

HIS ATTORNEY.

ELECTRON BEAM SWITCHING SYSTEM FOR MULTIPLEXING

Filed June 29, 1954 3 Sheets-Sheet 2

ROBERT ADLER
*INVENTOR.*

BY Francis W. Crotty

HIS ATTORNEY.

ELECTRON BEAM SWITCHING SYSTEM FOR MULTIPLEXING

Filed June 29, 1954 3 Sheets-Sheet 3

ROBERT ADLER
*INVENTOR.*

BY Francis W. Crotty

HIS ATTORNEY.

United States Patent Office 2,882,398

Patented Apr. 14, 1959

2,882,398

ELECTRON BEAM SWITCHING SYSTEM FOR MULTIPLEXING

Robert Adler, Northfield, Ill., assignor to Zenith Radio Corporation, a corporation of Delaware Application June 29, 1954, Serial No. 440,224

3 Claims. (Cl. 250—27)

This invention pertains to a new and improved electron-discharge switching system suitable for high-frequency switching and/or multiplexing of electrical signals. One specific embodiment of the invention is particularly advantageous when employed as an encoding or multiplexing system for audio signals in a secrecy communications system and will be described in that connection.

In many different fields of application, it is desirable to transmit intermittent portions of an intelligence signal such as an audio-frequency electrical signal in such a manner as to permit reconstitution of the original signal at some subsequent stage in the transmission system. Thus, it may be desirable to apply a single signal to a transmission channel or load device in intermittent fashion. In other applications, two or more signals may be translated through a single channel by applying the two signals to that channel in alternation; switching of the signals is preferably effected at a frequency substantially higher than the frequency range of the intelligence signals to avoid ambiguity or distortion in reproduction. For example, two audio signal sources may be connected to a single transmission channel or load device and a shunting circuit comprising a diode or other electron-discharge device may be connected to each of the signal sources so that they may be alternately effectively disconnected from that load. In systems of this type, however, it is extremely difficult to obtain shunting devices which have identical characteristics and which continue to operate in substantially identical fashion throughout their useful life. This is particularly true of conventional electron-discharge devices, in which changes in contact potential, cathode emission characteristics, and other factors tend to cause differences in the characteristics of the individual tubes. These discrepancies between the individual switching devices cause potential fluctuations at the switching frequency to be applied to the load, even at times when the desired signal is equal to zero. In many applications, such as multiplexing of audio signals, this effect is highly undesirable and may lead to substantial distortion or interference when the original signal or signals are reconstituted at a subsequent stage of the transmission system.

One particular environment in which it may be desirable to apply two separately identifiable signals to a single load device is subscription television. In conjunction with a secrecy or subscription type television broadcast, it is usually desirable to transmit the accompanying audio information in a manner which precludes accurate or intelligible reproduction by unauthorized receivers. In one sound-coding system, which is described in the copending application of E. M. Roschke, Serial No. 366,727, filed July 8, 1953, and assigned to the same assignee as the present invention, the audio information is coded at the transmitter by alternately transmitting two oppositely-phased audio signals. This phase inversion is carried out in accordance with a predetermined coding schedule; in order to secure accurate reproduction of the sound at a television receiver, it is necessary to invert portions of the received signal with respect to other portions in accordance with the same coding schedule. In thus decoding the received signal by applying it in alternating phase to the speaker of the receiver, substantial difficulty has been encountered in avoiding the occurrence of a spurious signal which consists of potential fluctuations at the rate of inversions or switching. In addition, it has been somewhat difficult to obtain the requisite balance for the two signals as applied to the sound reproducer.

For an application of this general type, the switching device employed should have certain characteristics. In a device designed to interrupt transmission through a signaling channel by establishing a short circuit thereacross, the admittance of the output electrode must be relatively high. At the same time, the transconductance of the output electrode with respect to the electrode employed to control the switching operation should be negligible over a substantial range of switching electrode potentials, so that unavoidable variations in switching voltage do not appreciably affect the amplitude of the signal translated to the load nor produce therein spurious signals corresponding to the switching rate. For particular applications, it is often desirable that the current drawn by the switching electrodes be relatively small in order to reduce power requirements in this portion of the system; for the same general reasons, it is usually preferably that the small current which is unavoidably drawn by the switching electrode be unaffected by the signal current drawn by the output electrode. Then too, it is extremely desirable that a switching device of this general type be relatively simple and economical in construction, particularly for mass production applications such as subscription television receiver decoders.

It is an object of the invention, therefore, to provide a new and improved electron-discharge switching system which employs a device avoiding the problems and difficulties of known devices as set forth above.

It is a more specific object of the invention to provide a new and improved electron-discharge switching system which effectively avoids imposition of switching-frequency voltage fluctuations upon a translated signal.

It is an additional object of the invention to provide a new and improved electron-discharge switching system comprising a device having a relatively high output electrode admittance and negligible transconductance of the output electrode with respect to the switching electrode over a wide range of switching electrode potentials.

It is another object of the invention to provide a new and improved electron-discharge switching system in which variations in output current are not reflected in changes in current to the switching electrodes of the device and in which the switching current is held to a minimum.

It is a corollary object of the invention to provide a new and improved electron-discharge switching system which achieves the aforementioned objectives yet is relatively simple and economical in construction.

An electron-discharge switching device constructed in accordance with the invention comprises, in the order named, means comprising an electron-emissive cathode for projecting a stream of electrons generally along a reference path, a first accelerator electrode including an aperture centered about that path, and a gating electrode which also includes an aperture centered about the reference path. The next electrode is an accelerator, which includes an aperture encompassing the reference path; this second accelerator electrode is followed by a pair of controllector electrodes having control portions disposed on opposite sides of the reference path and terminating in collector portions conjointly defining a collector system which effectively intercepts the electron stream at a location more remote from the cathode than the control portions. In the inventive system, there is included means for applying an intelligence signal to a selected one of the controllector electrodes in the first electrode system together with a load circuit coupled to a selected controllector electrode in each of the electrode systems. For multiplexing, the system also includes means for applying a switching signal preferably in push-pull relationship to the gating electrodes of the two electrode systems to cut off the two electron streams from the collector systems in alternation and effectively maintain the average potential of the load circuit at a constant level.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures, and in which:

Figure 1:
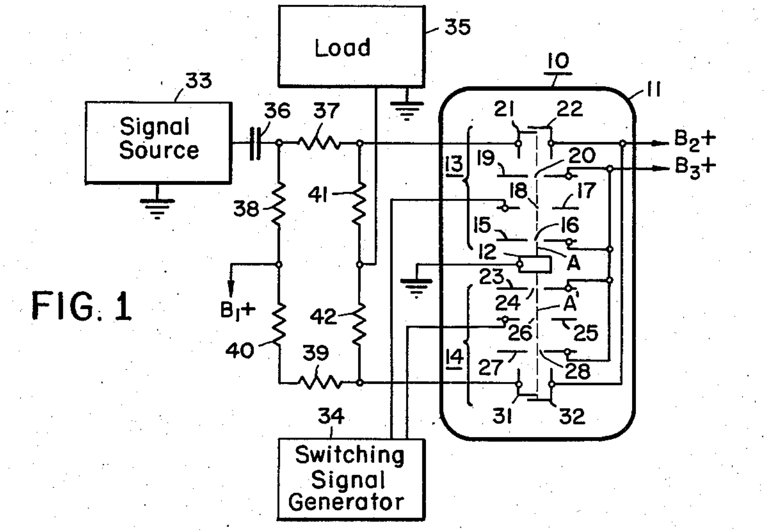
Figure 1 is a schematic diagram of one embodiment of the invention in the form of an electronic single-pole double-throw switch.

The single-pole double-throw embodiment of the invention illustrated in Figure 1 includes an electron-discharge switching device 10 comprising an evacuated envelope 11 and an electron-emissive cathode 12 positioned within the envelope. Switch tube 10 further includes two separate electrode systems 13 and 14 mounted within envelope 11 on opposite sides of cathode 12; preferably, the two electrode systems are substantially identical to each other both physically and electrically. Electrode system 13 includes an accelerator electrode 15 having an aperture or slot 16, a switching electrode 17 including a slot 18, and a second accelerator 19 having an aperture 20; electrode slots 16, 18 and 20 are preferably aligned with each other to define a reference path having a central axis indicated by dashed line A. Electrode 17 is referred to in this specification as a switching electrode because it is this electrode which effects the switching of device 10 between first and second modes of operation as hereinafter described; however, electrode 17 is, per se, a gating electrode.

Electrode system 13 further includes a pair of controllector electrodes 21 and 22 disposed opposite slot 20 on the side of accelerator 19 opposite cathode 12. Each of electrodes 21 and 22 comprises a longitudinally extending deflection-control portion disposed in a plane substantially parallel to reference path axis A and a collector portion on the same side of the axis as the control portion; the collector and control portions of the electrodes are electrically connected to each other, preferably by integral construction from a sheet of conductive material. The collector portions of the two electrodes 21 and 22 conjointly define a collector system which effectively intercepts the reference axis A at a location more remote from cathode 12 than the control portions. Specifically, in the illustrated embodiment the collector portions constitute inwardly directed integral parts of the respective electrodes 21 and 22 extending toward reference path axis A in spaced parallel planes substantially perpendicular to the axis, and at least one of the collector portions intersects the axis to provide an effectively completely closed collector system. For convenience, in the absence of any established terminology for describing electrodes of this type, electrodes 21 and 22 are hereinafter termed "controllector electrodes," a term derived from a contracted combination of "control" and "collector." The controllector system may also be considered as a pair of deflection-control electrodes and a pair of collector electrodes electrically connected to and preferably integral with the control electrodes; the operational characteristics of electrodes of this type are described in detail in the copending application of Robert Adler, Serial No. 263,737, filed December 28, 1951, now U.S. Patent 2,741,721, issued April 10, 1956, assigned to the present assignee and of which the present application is a continuation-in-part.

The second electrode system 14 of device 10 comprises a first accelerator 23 having an aperture 24, a switching or gating electrode 25 including a slot 26 and a second accelerator 27 having a slot 28; electrodes 23, 25 and 27 are preferably substantially identical in construction with electrodes 15, 17 and 19 respectively of system 13, and slots 24, 26 and 28 are preferably symmetrically aligned with respect to a second reference path having a central axis indicated by dash line A'. Electrode system 14 also comprises a pair of controllector electrodes 31 and 32 which may be substantially identical in construction with electrodes 21 and 22.

The circuit elements coupled to device 10 in Figure 1 include a single-ended signal source 33, a switching-signal generator 34, and a load device 35. Signal source 33 may comprise any source of electrical signals to be intermittently applied to load 35; for example, source 33 may represent the amplifier, detector and/or demodulator circuits of a receiver intended for use in a system in which an intelligence signal is coded by intermittent insertion of jamming signals in accordance with a preselected schedule, whereas load 35 may comprise a suitable reproducing device such as a speaker or cathode-ray tube. Switching-signal generator 34 may comprise any circuit capable of developing a square wave having a frequency equal to the desired rate of switching.

Signal source 33 is coupled to controllector electrode 21 of device 10 through a coupling capacitor 36 and a resistor 37. Controllector electrode 21 is also connected through resistor 37 and an additional resistor 38 to a first source of positive unidirectional operating potential $B_1+$. Controllector electrode 31 is coupled to operating potential source $B_1+$ through a pair of resistors 39 and 40 which are preferably electrically identical to resistors 37 and 38 respectively.

Load 35 is coupled between controllector electrodes 21 and 31 by means of a pair of load resistors 41 and 42 which are preferably electrically identical with each other. Switching-signal generator 34 is coupled in push-pull relationship to switching electrodes 17 and 25. Cathode 12 is connected to a plane of reference potential, here shown as ground, and accelerator electrodes 15, 19, 23 and 27 are all electrically interconnected and are connected to an additional source of positive operating potential $B_3+$. Controllector electrodes 22 and 32 are connected to each other and to another source of D.C. operating potential $B_2+$.

The operation of the embodiment of the invention illustrated in Figure 1 may best be understood by first considering the functional characteristics of electron-discharge device 10 and by subsequently considering the operation of the circuitry associated with the tube. Consequently, during discussion of the operation of tube 10, it will be assumed that suitable operating potential sources are available for each of the electrodes of the tube.

Figure 2A:
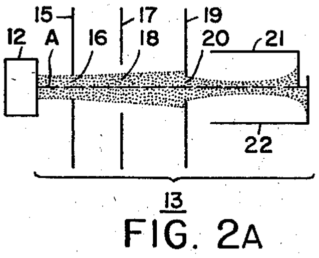
Figures 2A, 2B and 2C are schematic representations illustrating a feature of the operation of the invention.

When tube 10 is placed in operation, the voltage sources connected to the various electrodes of system 13 may be adjusted so that accelerators 15 and 19 are at a positive potential with respect to cathode 12 and controllector electrodes 21 and 22 are maintained at a substantially lower potential which is also positive with respect to the cathode, the potentials on the two controllector electrodes being approximately equal. At the same time, for reasons to be made apparent hereinafter, the potential of switching electrode 17 is made approximately equal to that of accelerators 15 and 19. These voltage conditions establish a first mode of operation of electrode system 13, in which a stream of electrons emitted from cathode 12 is focused by the electrostatic lens established by the potential difference between electrodes 12 and 15 so that a substantial portion of the electron stream passes through accelerator aperture 16, as indicated in Figure 2A. After traversing slot 16, the electron beam enters an essentially field-free space, since electrodes 15, 17 and 19 are all maintained at approximately the same potential. The beam diverges slightly, due to the fact that a slotted electrode located between an accelerating and a nonaccelerating space functions as a divergent electron lens; for this reason, switching electrode aperture 18 is preferably made substantially larger than accelerator slot 16 so that the switching electrode does not intercept a substantial portion of the primary beam current. The beam continues along the reference path generally centered about line A toward accelerator 19; because aperture 20 is approximately the same size as aperture 16, a portion of the beam is intercepted by accelerator 19. A substantial portion of the beam, however, continues along reference path A and is intercepted by controllector electrodes 21 and 22.

To establish a second mode of operation for switch tube 10, the potential of switching electrode 17 is reduced so that substantially all of the electron stream is rejected back toward accelerator 15 and cathode 12. Preferably, switching electrode 17 is driven negative with respect to cathode 12 during this second mode of operation so that the entire electron stream is sure to be cut off completely. Thus, the potential upon switching electrode 17 is effectively varied to turn or gate the beam on or off and thereby establish two distinct modes of operation for electrode system 13.

Electrode system 14, the other half of tube 10, operates in exactly the same manner as electrode system 13 except that when the electron stream following path A through system 13 is permitted to continue along the reference path to impinge upon controllector electrodes 21 and 22, the electron stream progressing through system 14 along path A′ is preferably cut off; similarly, when the beam in system 13 is interrupted, switching electrode 25 is maintained at a potential approximately equal to that of accelerators 23, 27 so that a major portion of the second electron stream reaches controllector electrodes 31 and 32.

Figure 2B:
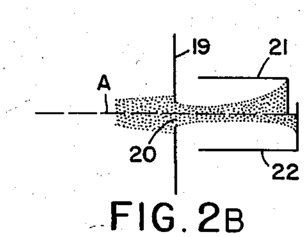
Figure 2C:
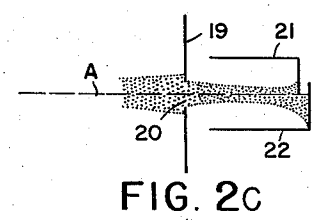

The operational characteristics of controllector electrodes 21 and 22 are schematically illustrated in Figures 2A, 2B and 2C, in which the electron stream is shown in stippled form. As indicated in Figure 2A, when controllector electrodes 21 and 22 are instantaneously maintained at approximately equal potentials which are substantially different from the potential of accelerator 19, the accelerator and controllector electrodes form an electrostatic lens which focuses the beam to converge upon the collector portions of the controllector electrodes. Preferably, the potential of the controllector electrodes should be between one-fifth and one-third of the positive potential of accelerator 179. If the potential of controllector electrode 21 is instantaneously increased with respect to that of electrode 22, the electron stream passing through slot 20 is deflected so that a majority of the beam impinges upon the collector portion of electrode

21, as indicated in Figure 2B and as distinguished from the substantially equal beam distribution shown in Figure 2A. On the other hand, if the potential of electrode 22 instantaneously exceeds that of electrode 21 by a predetermined amount, most of the electrons passing through slot 20 are deflected to impinge upon collector portion of electrode 22, as illustrated in Figure 2C. Thus, a signal voltage may be applied to electrode 21 to vary the potential difference between the two controllector electrodes and to effect corresponding variations in the beam current intercepted by their respective collector portions. At the low voltages and relatively high beam currents employed in practical embodiments of the invention, the described focusing process is modified by space charge effects; a sharp focus is often not observable, but the qualitative characteristics are as described.

When electrode system 13 is in its initial operating condition, with the electron stream continuing along path A to impinge upon the controllector electrodes, a signal voltage applied between the controllector electrodes results in substantial variations in the beam current distribution between those electrodes; thus, a relatively high admittance is established between the two controllectors. During the second mode of operation, on the other hand, the controllector electrodes are not coupled by an electron stream and the admittance between those two electrodes is effectively equal to zero. Thus, a signal applied to switching electrode 17 is employed to turn the electron beam on or to cut it off to establish, in alternation, either a high admittance or zero admittance between the controllector electrodes. Moreover, as indicated above, the opposite operating conditions obtain in electrode system 14 during the corresponding operational modes, since the electron stream in this section is cut off when the beam in system 13 is turned on and vice versa.

The functional requirements and modes of operation of switch tube 10 described immediately above are to a certain extent determinative of the electrical characteristics of the circuit associated with the tube. For example, when electrode system 13 is established in its first mode of operation, the D.C. potential applied to controllector electrode 21 from source $B_1+$ should be approximately equal to the operating voltage applied to electrode 22 from source $B_2+$. Because the beam current along path A is equally divided between controllector electrodes 21 and 22 (in the absence of any signal impressed upon electrode 21) the two parallel paths comprising resistors 37, 38 and resistors 39—41 must be so proportioned that the voltage drop across the two paths is equal to the difference between $B_1+$ and $B_2+$ at a current equal to one-half the total beam current. Similarly, during the second mode of operation, when the electron stream along path A is cut off and the stream following path A′ is turned on, the voltage drop across the two parallel paths comprising resistors 39, 40 and resistors 37, 38, 41, 42, at a current equal to one-half the total beam current in this section of the tube, must also be equal to the difference between $B_1+$ and $B_2+$. Moreover, in order to avoid fluctuations in the voltage applied to load 35, the two parallel electrical paths comprising resistors 37, 38, 41 and resistors 39, 40, 42 should be balanced; otherwise, an undesirable signal having a frequency equal to the switching frequency will be applied to the load.

The electron stream traversing system 13 should be permitted to continue along path A to impinge upon electrodes 21 and 22 at all times when the electron stream through system 14 is effectively cut off and the beam following path A should similarly be cut off at all times when the beam through system 14 is turned on; consequently, switching signal generator 34 should preferably provide a signal wave which is of approximately rectangular configuration. However, it is extremely difficult to obtain an exactly accurate rectangular waveform without resorting to inordinately complex circuitry so that tube 10 should be unaffected in operation over a range of switching signal voltages. In this respect, tube 10 is particularly effective, as may be understood by reference to the operating characteristics illustrated by Figure 3A.

Figure 3A:
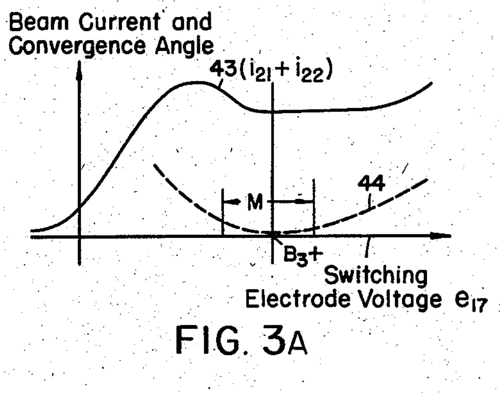
Figures 3A and 3B are graphical representations of certain operating characteristics of the invention.

In Figure 3A the total beam current for electrode system 13 is illustrated as a function of switching electrode voltage and the convergence angle of the electron beam as it traverses the unipotential lens comprising electrodes 15, 17 and 19 is also plotted against the switching voltage. As indicated by line 43 in this figure, the total beam current received by the two controllector electrodes increases rapidly as the potential of electrode 17 rises above that of cathode 12; after an initial peak, a stable current is reached which remains constant for a relatively wide range of switching voltages. Consequently, within this range variations in the switching electrode voltage do not affect the total beam current passing through slot 20 to impinge upon the controllector electrodes; in other words, the transconductance of switching electrode 17 with respect to the controllector electrode system remains zero over a substantial range of voltages.

In order to maintain the operation of the output electrode system 21, 22 independent of fluctuations in the switching voltage, the trajectories of the electrons of the beam passing through slot 20 should remain relatively constant over a reasonable range of switching voltages. Dash line 44 in Figure 3A illustrates the relationship between the convergence angle of the electron stream and the switching electrode potential and shows that the convergence angle remains virtually constant for a substantial range M of switching electrode potentials. Voltage range M establishes the limits within which the switching voltage may be allowed to vary when the beam is on; within these limits, the space between the two accelerators 15 and 19 is nearly field-free and consequently effectively lens-free, so that operation of the controllector electrodes is not disturbed by switching voltage fluctuations.

When the complete apparatus illustrated in Figure 1 is placed in operation, tube 10 may be instantaneously maintained in its second mode of operation, in which a major portion of the electron stream following path A′ is permitted to pass through slots 26 and 28 to impinge upon controllector electrodes 31 and 32. At the same time, of course, the beam following path A within electrode system 13 is cut off, the instantaneously effective mode of operation being determined by a signal voltage from generator 34. Electrode system 13 then appears as an open circuit to the signal impressed upon electrode 21 from source 33, so that a predetermined portion of that signal appears across resistors 37 and 41 and is applied to load circuit 35. The amplitude of the signal impressed upon load 35 is, of course, determined by the impedance values of resistors 37—42.

The desired switching action within tube 10 is affected by instantaneously varying the potentials applied to switching electrodes 17 and 25 by means of the square wave voltage from generator 34 so that the electron stream in system 14 is cut off and at the same time the electron beam within system 13 is effectively turned on and permitted to continue through slot 18 so that a major portion reaches the controllector electrodes. Electrode system 13 then appears as a low impedance path shunting electrode 21 to ground and the signal from source 33 is translated to load 35 in highly attenuated form.

Figure 3B:
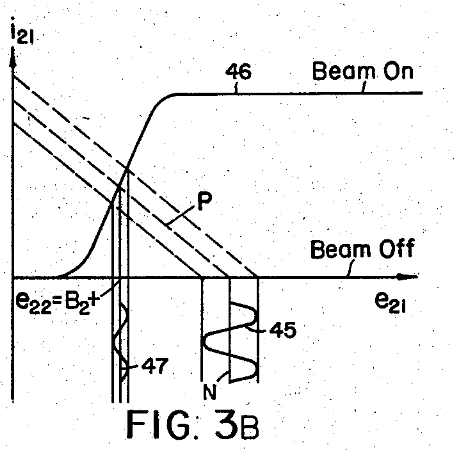

The alternative operating conditions for device 10 are illustrated in Figure 3B, in which the current $i_{21}$ drawn by controllector electrode 21 is plotted as a function of the voltage of controllector electrode 21, indicated as $e_{21}$. During intervals when the electron beam in system 13 is cut off, the potential of electrode 21 is substantially higher than when the beam is on, the exact value being determined by the parameters of the external resistance network; this open-circuit potential is indicated by line N. The current drawn by controllector electrode 21 is shown by line 46, the constant-current portion of the curve representing the maximum amount of beam current which may be drawn by the complete controllector electrode system. In accordance with a technique well known in the art, the signal voltage on electrode 21 may be determined by drawing load lines such as dash line P with a slope corresponding to the combined external resistances from the open circuit voltage N on the voltage axis to their intersection with characteristic curve 46.

When a signal, represented by sine wave 45, is applied to electrode 21 from source 33 with tube 10 in its second operating mode and the electron beam along path A cut off, the signal can of course effect no change in current drawn by the controllector electrode system because the two controllectors are effectively open-circuited. Accordingly, the potential difference between electrode 21 and cathode 12, which is equal to the potential across resistor 41, remains substantially identical with applied signal 45. When switching signal generator 34 switches tube 10 to its alternative mode of operation, however, with the beam following path A to impinge upon electrodes 21 and 22 and with the beam through electrode system 14 cut off, controllector electrode 21 intercepts a definite portion of the beam current as indicated by characteristic 46. The beam current is equally distributed between the two controllector electrodes when $e_{21}$ is equal to the voltage $e_{22}$ of electrode 22 as determined by the potential applied to electrode 22 from source $B_2+$. The applied signal 45, by varying the potential difference between controllector electrodes 21 and 22, varies the portion of the total beam current intercepted by electrode 21 as described in connection with Figures 2A–2C. Employing the aforementioned load line technique, it is seen that the voltage drop between electrode 21 and cathode 12 no longer corresponds to curve 45; rather, the potential between these two electrodes varies as indicated by curve 47, which has a peak-to-peak amplitude that is very small in relation to the amplitude of curve 45.

As indicated by the operating characteristics of Figures 3A and 3B, switch tube 10 may be constructed so that the admittance of the output electrode, controllector electrode 21, defined as the slope of the transfer characteristic at the operating point, is relatively high and substantially constant; the tube thus approximates a short circuit shunting the signal from source 33 around load resistors 41 and 42. On the other hand, the current drawn by controllector electrode 21 is independent of minor variations in the potential of switching electrode 17; consequently, the operation of switch tube 10 is in no way affected by minor variations in the square wave switching signal applied to electrodes 17 and 25 from source 34. The average or D.C. potential applied to load 35 does not change with switching, since the external circuit comprising resistors 37–42 may be balanced so that the D.C. potential applied to load 35 from source $B_1+$ is identical through either of the two alternate paths and the balanced construction of the tube precludes any changes which might arise from changes in operating conditions in that device. Moreover, variations in current distribution between the two controllector electrodes 21 and 22, caused by the applied signal, are not reflected in the current drawn by switching electrode 17; consequently, signals from source 33 are not translated back through the switching generator to any other device or circuits which might be actuated from that same generator. Actually, the current drawn by the switching electrodes is extremely small and the power requirements imposed upon generator 34 are negligible.

The construction of electrode systems 13 and 14 is extremely simple; for example, all of the electrodes of the two systems may be formed as stamped parts from sheet metal. Depending upon the particular electrode configurations chosen, it may be desirable to bring out separate leads for the various accelerator electrodes so that the operating potentials of the individual accelerators may be made somewhat different from each other to achieve optimum focusing of the electron stream within the controllector electrode systems. In general, slot 18 of electrode 17 should be made somewhat larger than accelerator slots 24 and 28.

Figure 4:
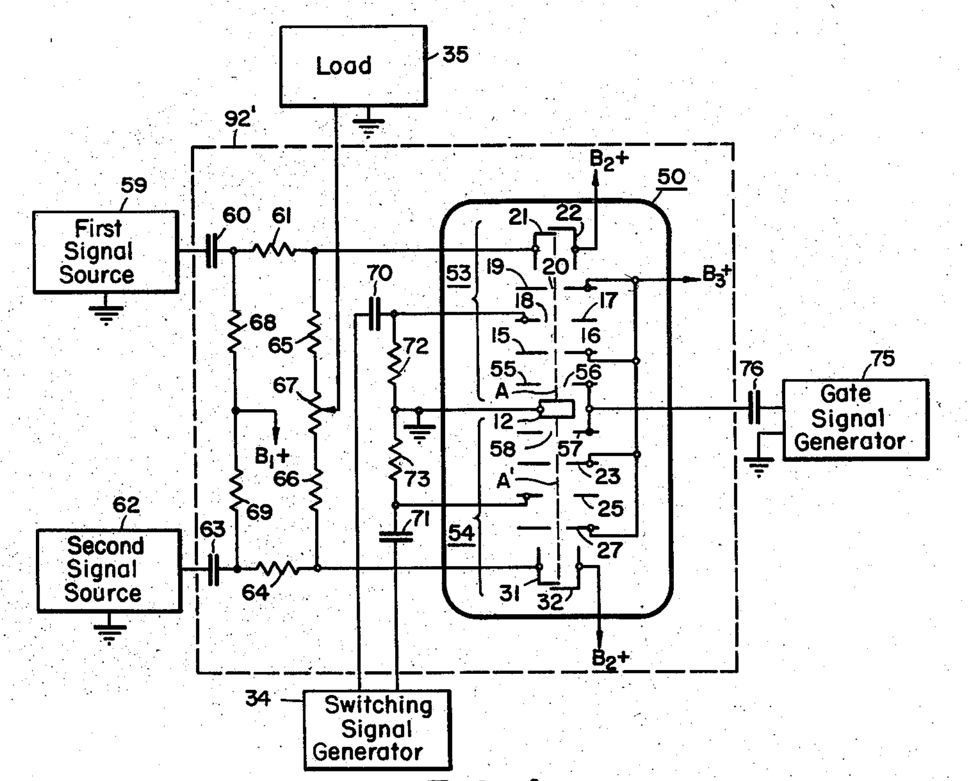
Figure 4 is a schematic view of another embodiment of the invention in the form of an electronic double-pole double-throw switch.

Figure 4 illustrates a preferred embodiment of the invention which may be employed in a multiplexing system. The switch tube 50 of Figure 4 is in most respects essentially similar in construction to tube 10 of Figure 1; tube 50 includes a cathode 12 and a pair of electrode systems 53 and 54 which are substantially similar to electrode systems 13 and 14 of tube 10. Electrode system 53 comprises an accelerator 15, a switching electrode 17, a second accelerator 19 and a pair of controllector electrodes 21 and 22 which may be identical with the similarly numbered elements of tube 10. Electrode system 54 is preferably identical in construction with system 53 and includes first and second accelerators 23 and 27, a switching electrode 25, and a pair of controllector electrodes 31 and 32 corresponding to elements identified by the same numbers in tube 10. In addition, switch tube 50 includes a control or gating electrode 55 interposed between first accelerator 15 and cathode 12 and having an aperture 56 which is preferably aligned with the other electrode apertures 16, 18 and 20 of system 53 so as to be symmetrical with respect to beam axis A. Electrode system 54 includes an additional gating electrode 57 having an aperture 58 encompassing the second reference path center line A.

In this embodiment of the invention, controllector electrode 21 is coupled to a first signal source 59 through a coupling capacitor 60 and a resistor 61; similarly, controllector electrode 31 is coupled to a second signal source 62 through a coupling capacitor 63 and a resistor 64. Electrodes 21 and 31 are connected to each other by means of a potential divider including two fixed resistors 65 and 66 and a variable resistor 67. The controllector electrodes are also coupled through resistors 61 and 64 and a pair of bias resistors 68 and 69 to operating potential source $B_1+$. As in the embodiment of Figure 1, controllector electrodes 22 and 32 are connected to a common source of positive operating potential $B_2+$ and accelerator electrodes 15, 19, 23 and 27 are all interconnected and connected to a third source of positive D.C. potential $B_3+$. Switching-signal generator 34 is coupled to switching electrodes 17 and 25 through a pair of coupling capacitors 70 and 71 respectively; the two switching electrodes are individually connected to ground through a pair of self-biasing resistors 72 and 73. As in the previous embodiment, cathode 12 is grounded. The load circuit 35 is connected between the variable tap on resistor 67 and ground. Gating electrodes 55 and 57 are connected to each other and are coupled to a gate signal generator 75 by means of a coupling capacitor 76.

Figure 5:
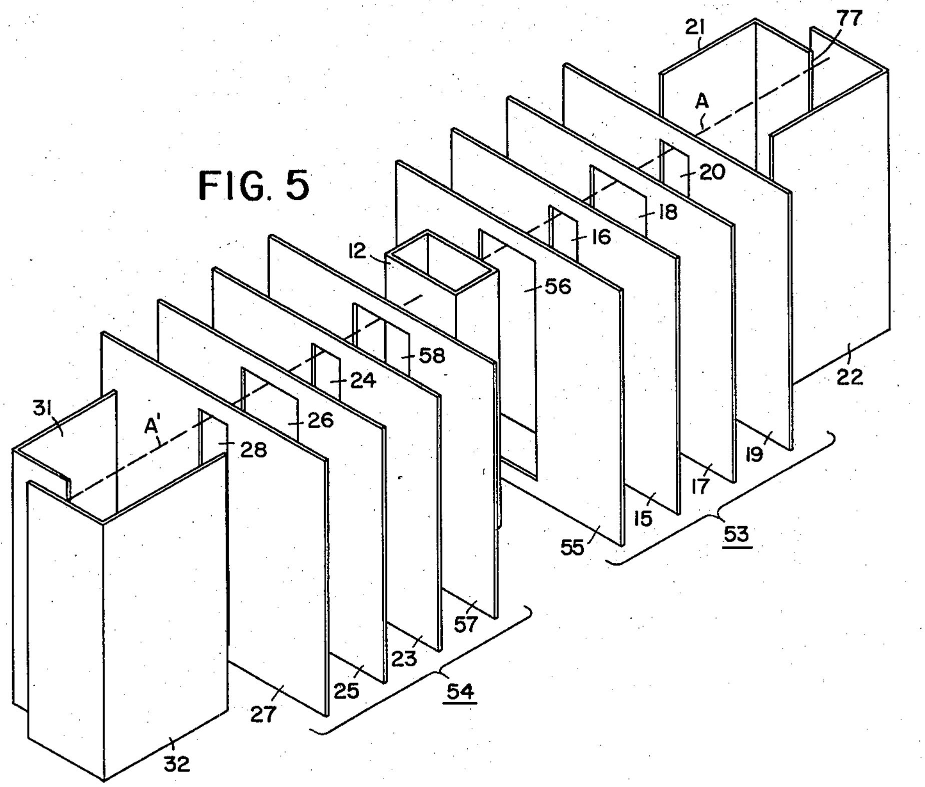
Figure 5 is an oblique view of the electrode systems of the electron-discharge switching device of Figure 4.

The electrode systems of tube 50 are illustrated in perspective in Figure 5. As shown in that figure, it is preferred that the tube employ an elongated cathode 12 so that the two electron streams projected therefrom are generally sheet-like in form; that is, the electron streams preferably have one cross-sectional dimension which is substantially larger than the other cross-sectional dimension. Similarly, electrode apertures 16, 18, 20 and 56 of system 53 are of generally elongated rectangular form, as are the electrode slots in system 54. Gating electrode slot 56 is preferably substantially wider than the apertures in accelerators 15 and 19, as is switching electrode slot 18, so that gating electrode 55 and switching electrode 17 do not function as limiting apertures and do not draw excessive current. The same considerations apply to the corresponding electrodes of system 54; slots 58 and 26 are preferably made substantially wider than accelerator slots 24 and 28. As in the previous embodiment, the effective junction of controllector electrodes 21 and 22, which is defined by the intercepting edge 77 of the collector portion of electrode 21, is made to coincide with reference path center line A, and controllector electrodes 31 and 32 are similarly aligned with respect to path A′. Many of the electrodes may, if desired, be constructed as integral parts of combinations with other electrodes; for example, accelerators 15 and 19 may be constructed from a single U-shaped or rectangular sheet of metal, as may accelerators 23 and 27 and gating electrodes 55 and 57. Controllectors 22 and 32 may also be combined in an integral structure. It is not essential that the apertured electrodes completely encompass the beam path; for example, U-shaped electrodes may be employed if desired, or individual elements disposed on opposite sides of the path may be substituted for the electrodes illustrated. However, switching electrodes 17 and 25 must be capable of rejecting back substantially all of the electron stream in order to obtain the above described second mode of operation.

When the apparatus of Figure 4 is placed in operation, a predetermined portion of the signal from first source 59 appears across resistors 61 and 65 and a portion of variable resistor 67 and is thus applied to load 35. Similarly, the signal from second source 62 is simultaneously applied to the load through resistors 64, 66 and 67, and, except for the action of switch tube 50, the two distinct signals would be applied in intermingled confused form to the load circuit. However, if the square wave applied in push-pull fashion to switching electrodes 17 and 25 from generator 34 is of the proper instantaneous polarity and magnitude to permit the electron stream following path A′ to continue through system 54 to impinge upon controllector electrode system 21, 32 and at the same time to cut off the electron stream following reference path A, this intermingling and confusion does not take place. Rather, the electron stream presents a low-impedance path between controllector electrode 31 and ground, shunting resistor 66 and a portion of resistor 67, so that only a relatively small portion of the signal voltage from source 62 is applied to load 35.

As in the embodiment of Figure 1, switching between the two signal sources is effected by means of the square-wave signal from generator 34; when the switching-signal generator reverses the relative polarities of switching electrode 17 and 25 with respect to cathode 12, the beam following path A is permitted to continue through electrode system 53 to impinge upon controllector electrodes 21 and 22 and at the same time the beam following path A′ is cut off. With tube 50 in this second operating condition, the signal from first source 59 is effectively short-circuited to ground and appears in very much attenuated form at load 35 whereas a substantial portion of the signal from second source 62 is applied to the load. Thus, the square wave from switching-signal generator 34 is applied to the two switching electrodes to cut off the two electron streams from their respective collector systems in alternation; expressed differently, switching is achieved by varying the potential of each of the switching electrodes with respect to cathode 12 between a first potential at which substantially all of the electron stream is reflected back toward the first accelerator and cathode and a second potential at which a substantial portion of the electron stream passes through the switching electrode aperture.

The embodiment of the invention illustrated in Figure 4 takes advantage of the switching electrode current to maintain the switching electrode near the accelerator potential when the beam is on. The current drawn by switching electrode 17, for example, includes a very small primary beam current, but most of the current is derived from secondary electrons from accelerator 19. Although the secondary current may vary over a wide range, it has one dependable characteristic; no secondaries are accepted by electrode 17 until it approaches the potential of accelerator 19, after which the secondary current rises sharply. Consequently, the connection of resistor 72 between electrode 17 and ground (the resistor could also be returned to some positive potential lower than $B_3+$) provides a self-biasing circuit for the switching electrode. Resistor 73, of course, provides the same corrective effect for the voltage on switching electrode 25.

The two electrode systems of tube 50 may not have completely identical operating characteristics and may develop slightly different maximum beam currents, and it is usually desirable to provide some means for balancing the external circuit to compensate for this effect as well as to correct for any unbalance due to variations between the components of the circuit itself. Variable resistor 67 effectively accomplishes this purpose and may be employed to adjust the relative voltages on controllectors 21 and 31 so that no switching-frequency voltage is observed at load 35.

In switching between the two alternative operating conditions of the apparatus of Figure 4, transient impulses are set up in the switching system and applied to load 35. In order to avoid any possible undesirable effects from such transients, the two beams are gated on and off at a frequency substantially higher than the switching frequency by means of signals from gate signal generator 75 applied to electrodes 55 and 57. Preferably, the gating signal frequency is a relatively high harmonic of the switching signal frequency and is so phased with respect to the switching signal from generator 54 that the two electron streams are always cut off during the actual switching interval when the voltages on switching electrode 17 and 25 are changed. This type of gating is described and claimed in the copending application of Howard K. Van Jepmond, Serial No. 397,176, filed December 9, 1953, and assigned to the same assignee as the present invention; accordingly, the advantages and details of operation of the gating system need not be detailed here.

Figure 6:
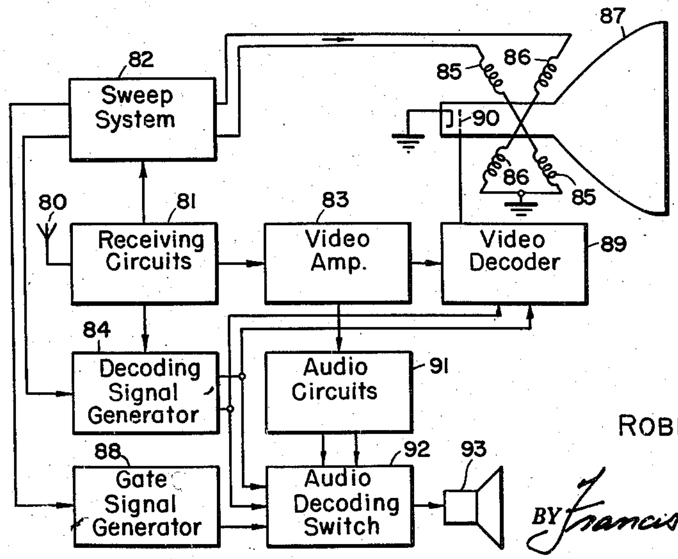
Figure 6 is a block diagram, partially schematic, illustrating a typical application of the embodiment of Figure 4.

Figure 6 illustrates in block diagram form a particular environment in which the switching device of Figure 4 has been employed to considerable advantage. The apparatus of Figure 6 comprises a subscription type television receiver including an antenna 80 connected to a receiving circuit system 81; receiving circuits 81 may include, for example, one or more radio-frequency amplifier stages, a first detector, one or more intermediate-frequency amplifier stages, a second detector, and other conventional television receiving circuits. Receiving circuits 81 are connected to a sweep system 82, a video amplifier 83, and a decoding-signal generator 84. Sweep system 82 is coupled to the deflection system of a conventional cathode-ray tube image reproducer 87, here represented by two pairs of deflection coils 85 and 86. Sweep system 82 is also coupled to decoding-signal generator 84 and to a gate signal generator 88. Video amplifier 83 is connected to a video decoder 89 which, in turn, is coupled to the control electrode 90 of image reproducer 87. Video amplifier 83 is also connected to the audio circuits 91 of the receiver, which may include a suitable intercarrier type detector system and one or more stages of audio amplification. Audio circuits 91 are coupled in push-pull relationship to an audio decoding switch 92, and the decoding switch is in turn connected to a load circuit comprising a loudspeaker 93. Decoding-signal generator 84 is coupled to video decoder 89 and to audio decoding switch 92.

The subscription television receiver illustrated in Figure 6 constitutes a highly simplified version of the receivers described and claimed in the aforementioned copending applications of E. M. Roschke and H. K. Van Jepmond; consequently, only a brief summary of the operation of the receiver is included here. The receiver is intended to operate in a subscription television system in which both the video and audio portions of the composite telecast are coded at the transmitter and must be decoded at the receiver. The particular type of coding selected for the video components of the transmitted signal is immaterial insofar as the present invention is concerned; for example, coding may be achieved by selectively intermittently delaying predetermined portions of the composite video signal with respect to other portions in accordance with a predetermined coding schedule. At the same time, the audio signal components of the transmitted signal are selectively intermittently inverted in phase in accordance with the same coding schedule. In order to achieve intelligible reproduction of the telecast, the coding schedule is made available at the receiver by any one of several different means; for example, the coding schedule may be supplied to the receiver by a separate electrical circuit linking the receiver to the transmitter or may be transmitted as a portion of the television broadcast in accordance with the techniques described in the aforementioned Van Jepmond and Roschke applications.

The transmitted television signal is intercepted by antenna 80 and is applied to receiving circuits 81 wherein it is amplified and detected to generate a composite television signal including sweep-synchronizing components, code schedule components, video signal components, and audio signal components. The composite television signal is applied to sweep system 82, which may be of conventional construction; the sweep system isolates the scansion-synchronizing components of the composite television signal and employs those components to control the generation of the usual scansion-control signals, which are applied to the deflection system comprising coils 85 and 86. In accordance with the Roschke and Van Jepmond disclosures, the composite television signal and field-frequency scanning signals are applied to a decoding-signal generator, which develops a decoding signal representative of the coding schedule employed at the transmitter; the output signal from decoding-signal generator 84 in the illustrated system preferably comprises a square wave. This square-wave decoding signal is applied to audio decoding switch 92, preferably in push-pull manner, and is also supplied to video decoder 89.

The composite television signal developed in receiving circuits 81 is also applied to video amplifier 83, and the picture information components of that signal are translated through video decoder 89 to control electrode 90 of picture tube 87 to determine the picture content of the reproduced telecast. At the same time, the composite television signal is applied to audio circuits 91 in accordance with familiar intercarrier techniques and is employed therein to generate a coded audio signal which is applied in push-pull fashion to audio decoding switch 92. In addition, line-frequency signals from sweep system 82 are supplied to gate signal generator 88, which may comprise a simple harmonic generator, to develop a high-frequency gating signal which is supplied to audio decoding switch 92.

A comparison of Figure 6 with Figure 4 immediately indicates that audio decoding switch 92 of Figure 6 corresponds to that portion of Figure 4 enclosed within dash outline 92'. The push-pull output connection from audio circuits 91 of Figure 6 is substituted for the two separate signal sources 59 and 62 of Figure 4 and speaker 93 takes the place of load circuit 35. Gate signal generator 88 of the subscription television receiver replaces generator 75 of Figure 4 and the square-wave switching signal from generator 34 in the embodiment of Figure 4 is supplied by decoding-signal generator 84 of the receiver of Figure 6. It will be immediately apparent that the apparatus 92' of Figure 4, when connected in the receiver of Figure 6 in this manner, operates to apply either one of the two balanced output signals from audio circuits 91 to the speaker 93; because the two audio signals are inverted in phase with respect to each other, the audio decoding switch selectively inverts the signal supplied to the speaker in phase in accordance with a schedule determined by the decoding signal developed by generator 84. Undesirable transient effects are avoided by the use of gating signal 88 as described in connection in Figure 4 and as set forth in further detail in the copending Van Jepmond application noted above.

It has been found that the apparatus of Figure 4 provides excellent results when employed in the receiver of Figure 6. There are no noticeable undesirable switching-rate signals applied to speaker 93 caused by switching between the two phase-inverted audio signals from circuits 91. Decoding switch 92 requires very little power from decoding-signal generator 84, since the current drawn by the switching electrodes is negligible; similarly, the current required for gating electrodes 55 and 57 is extremely small. In addition, because the current drawn by the switching electrodes is not affected by the audio signals applied to the controllector electrodes, no audio-frequency components are fed back to the decoding-signal generator and, consequently, the operation of video decoder 89 and of image reproducer 87 is not afflicted with audio-frequency interference from this source. The decoding switch is extremely stable in operation because any changes in tube operating characteristics which might affect the translation of one of the two input signals to the speaker are almost invariably reflected in similar compensating changes in operating characteristics affecting the second of the audio signals. Changes in contact potential within the switch tube do not affect the balanced operation of the switch, and minor variations in the switching potential values are likewise insignificant insofar as operation of the circuit is concerned. In general, of course, the operational characteristics of the tube as a whole are much the same as those of the embodiment of Figure 1.

In order to provide a more specific and detailed illustration of the invention, the following data relating to the dimensional characteristics of tube 50 and the circuit parameters of switching circuit 92' are set forth below. This data, it should be understood, is provided merely by way of illustration, and in no sense as a limitation upon the invention.

| | | |
|---|---|---|
| Cathode length (Approx.) | inch | 13/16 |
| Gating electrode aperture widths | do | .04 |
| Accelerator electrode aperture widths | do | .02 |
| Switching electrode aperture widths | do | .04 |
| Spacing between controllector electrodes | do | .04 |
| Effective length of control portions of controllector electrodes | inch | .13 |
| Cathode-gate electrode spacing | do | .005 |
| Gate-accelerator electrode spacing | do | .055 |
| Accelerator-switch electrode spacings | do | .03 |
| Accelerator-controllector electrode spacings | do | .015 |
| $B_1+$ | volts | 260 |
| $B_2+$ | do | 9.5 |
| $B_3+$ | do | 40 |
| Resistors **68** and **69** | kilohms each | 390 |
| Resistors **61** and **64** | do | 100 |
| Resistors **65** and **66** | do | 100 |
| Resistor **67** | do | 25 |
| Resistor **72** and **73** | megohms each | 2.2 |
| Controllector electrode admittance $\left(Y_{21}=\frac{di_{21}}{de_{21}}\right)$ | micromhos | 400 |
| Approximate beam current $(i_{21}+i_{22})$, beam on | milliamperes | 1.6 |

Figure 7:
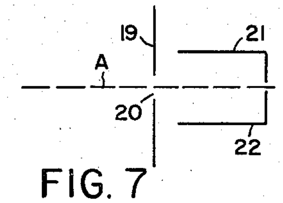
Figures 7, 8 and 9 are schematic representations of alternative output electrode arrangements for use in the device of Figure 5.
Figure 8:
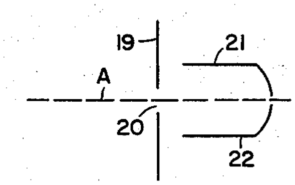
Figure 9:
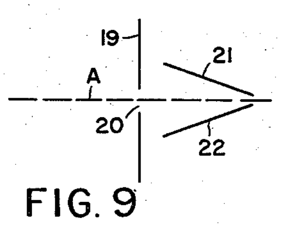

In both the embodiments thus far described, controllector electrodes 21, 22 and 31, 32 are illustrated as pairs of generally L-shaped solid plates having longitudinally extending deflection control portions disposed in substantially parallel planes and having collector portions extending toward each other in spaced parallel planes normal to the beam reference paths. This construction is preferred because all electrons passing through the accelerator slots are effectively trapped between the controllector electrodes. However, other constructions in which substantially all electrons are collected by the controllector electrode system may be employed. For example, in Figure 7 the collector portions of controllector electrodes 21 and 22 are coplanar, each extending inwardly toward and terminating just short of the beam path center line A. As indicated in Figure 8, the collector portions may be curved inwardly toward reference path A, while in the construction of Figure 9 the controllector electrodes constitute flat plates disposed in intersecting planes, the spacing between the plates diminishing to a minimum value at the ends thereof most remote from accelerator slot 20. It may be said of all of these constructions that each of the controllector electrodes comprises a control portion and a collector portion because each exerts a deflection-control influence upon the electron stream in addition to collecting space electrons; although it may be difficult to establish a precise boundary between the control and collector portions, it is nonetheless true that each of the electrodes performs both functions.

All of the electrodes in either of tubes 10 and 50 may be formed as simple stamped sheet metal parts; excellent results have been obtained using sheet nickel approximately .005" thick. The type of cathode employed is not particularly important in relation to the invention; directly and indirectly heated cathodes are both satisfactory.

The present invention provides a new and improved electron-discharge switching device adapted for use in a wide variety of switching and multiplexing applications as well as in the specific decoding system described in connection with Figure 6. The tube construction is extremely simple and economical and lends itself readily to mass production techniques. Furthermore, the switching device is capable of performance superior to that obtainable using most conventional devices and is inherently superior to any arrangement employing two separate switch tubes.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An electron-discharge switching apparatus comprising: means, including an electron-emissive cathode, for projecting two streams of electrons generally along two distinct reference paths; a first electrode system for controlling one of said electron streams, said electrode system including, in the order named along a first one of said reference paths, a first accelerator electrode having an aperture encompassing said first reference path, a gating electrode having an aperture encompassing said first path; a second accelerator electrode having an aperture encompassing said first path, and a pair of controllector electrodes having control portions disposed in opposite sides of said first path and terminating in collector portions which intercept said one electron stream at a location more remote from said cathode than said control portions; a second electrode system, for controlling the other one of said electron streams, including a first accelerator electrode, a gating electrode, a second accelerator electrode, and a pair of controllector electrodes all substantially similar to the corresponding electrodes of said first electrode system; means for applying an intelligence signal to a selected one of said controllector electrodes in said first electrode system; a load circuit coupled to a selected controllector electrode in each of said electrode systems; and means for applying a switching signal in push-pull relationship to said gating electrodes of said two electrode systems to cut off said two electron streams from said collector systems in alternation and effectively maintain the average potential of said load circuit at a constant level.

2. An electron-discharge switching apparatus comprising: means, including an electron-emissive cathode, for projecting two streams of electrons generally along two distinct reference paths; a first electrode system for controlling one of said electron streams, said electrode system including, in the order named along a first one of said reference paths, a first accelerator electrode having an aperture encompassing said first reference path, a gating electrode having an aperture encompassing said first path; a second accelerator electrode having an aperture encompassing said first path, and a pair of controllector electrodes having control portions disposed in opposite sides of said first path and terminating in collector portion which intercept said one electron stream at a location more remote from said cathode than said control portions; a second electrode system, for controlling the other one of said electron streams, including a first accelerator electrode, a gating electrode, a second accelerator electrode, and a pair of controllector electrodes all substantially similar to the corresponding electrodes of said first electrode system; means for applying an intelligence signal to a selected one of said controllector electrodes in said first electrode system; a load circuit coupled to said one controllector electrode and to a selected controllector electrode of said second system; means for applying a switching signal in push-pull relationship to said gating electrodes of said two electrode systems to cut off said two electron streams from said collector system in alternation and effectively maintain the average potential of said load circuit at a constant level; and self-biasing means for maintaining the potential of each of said gating electrodes substantially equal to the potential of the associated one of said second accelerator electrodes during intervals when said beam is not cut off, said self-biasing means comprising a pair of resistors individually connected between respective ones of said gating electrodes and a plane of reference potential.

3. An electron-discharge switching apparatus comprising: means, including an electron-emissive cathode, for projecting two streams of electrons generally along two distinct reference paths; a first electrode system for controlling one of said electron streams, said electrode system including, in the order named along a first one of said reference paths, a first accelerator electrode having an aperture encompassing said first reference path, a gating electrode having an aperture encompassing said first path; a second accelerator electrode having an aperture encompassing said first path, and a pair of controllector electrodes having control portions disposed in opposite sides of said first path and terminating in collector portions which intercept said one electron stream at a location more remote from said cathode than said control portions; a second electrode system, for controlling the other one of said electron streams, including a first accelerator electrode, a gating electrode, a second accelerator electrode, and a pair of controllector electrodes all substantially similar to the corresponding electrodes of said first electrode system; means for applying an intelligence signal to a selected one of said controllector electrodes in said first electrode system; means for applying a second intelligence signal to a selected one of said controllector electrodes in said second electrode system; a load circuit coupled to said one controllector electrode and to a selected controllector electrode of said second system; and means for applying a switching signal in push-pull relationship to said gating electrodes of said two electrode systems to cut off said two electron streams from said collector systems and apply said two intelligence signals to said load circuit in alternation while effectively maintaining the average potential of said load circuit at a constant level.

References Cited in the file of this patent

UNITED STATES PATENTS

| | | |
|---|---|---|
| 2,357,922 | Ziebolz | Sept. 12, 1944 |
| 2,412,467 | Morton | Dec. 10, 1946 |
| 2,438,928 | Labin et al. | Apr. 6, 1948 |
| 2,489,329 | Selgin | Nov. 29, 1949 |
| 2,606,300 | Adler | Aug. 5, 1952 |
| 2,615,142 | Adler | Oct. 21, 1952 |
| 2,741,721 | Adler | Apr. 10, 1956 |
| 2,758,210 | Adler | Aug. 7, 1956 |
| 2,781,468 | Adler | Feb. 12, 1957 |